United States Patent
Liu et al.

(10) Patent No.: US 12,085,503 B1
(45) Date of Patent: Sep. 10, 2024

(54) SPECTRAL PREPROCESSING METHOD AND DEVICE SUITABLE FOR FRUIT NEAR-INFRARED NONDESTRUCTIVE DETECTION, AND COMPUTER-READABLE MEDIUM

(71) Applicant: Optosky (Xiamen) Photonics Inc, Xiamen (CN)

(72) Inventors: HongFei Liu, Fujian (CN); XiaoXiao Huang, Guangdong (CN); QuXing Ruan, Wuhan (CN)

(73) Assignee: Optosky (Xiamen) Photonics Inc, Xiamen (CN)

( * ) Notice: Subject to any disclaimer, the term of this patent is extended or adjusted under 35 U.S.C. 154(b) by 0 days.

(21) Appl. No.: 18/409,663

(22) Filed: Jan. 10, 2024

(30) Foreign Application Priority Data

May 26, 2023 (CN) .......................... 202310604351.2

(51) Int. Cl.
*G01N 21/3563* (2014.01)
*G01N 21/359* (2014.01)

(52) U.S. Cl.
CPC ....... *G01N 21/3563* (2013.01); *G01N 21/359* (2013.01); *G01N 2021/3572* (2013.01)

(58) Field of Classification Search
CPC ............. G01N 21/3563; G01N 21/359; G01N 2021/3572
See application file for complete search history.

(56) References Cited

U.S. PATENT DOCUMENTS 9,174,245 B2 * 11/2015 Blanc .................... B07C 5/3422
2002/0011567 A1 * 1/2002 Ozanich ................ G01J 3/0224
250/326

FOREIGN PATENT DOCUMENTS

| CN | 103217409 | 7/2013 |
| CN | 107132198 | 9/2017 |
| CN | 115754184 | 3/2023 |
| KR | 20130021905 | 3/2013 |

OTHER PUBLICATIONS

Zhi-Hong Liu et al., "Study on Denoising in Pretreatment of Infrared Spectrum", Chinese Journal of Spectroscopy Laboratory, vol. 23, Jul. 2006, pp. 1-6.
Xiaoli Chu, "Molecular Spectroscopy Analytical Technology Combined with Chemometrics and its Applications", Chemical Industry Press Co., Ltd., Jul. 2011, pp. 1-406.

* cited by examiner

*Primary Examiner* — Courtney D Thomas
(74) *Attorney, Agent, or Firm* — JCIPRNET

(57) ABSTRACT

The present disclosure discloses a spectral preprocessing method and device suitable for fruit near-infrared nondestructive detection, which includes the following steps: calculating overall noise distribution of spectral data; performing adaptive threshold segmentation on the spectral data to form a plurality of segmentation intervals, calculating noise of each interval in each segmentation interval, performing cyclic adaptive parameter SG filtering on each interval of an original spectrum to find optimal filtering parameters; performing sliding polynomial fitting on the spectral data within the respective intervals, deriving a derivative of a fitting polynomial of each point at a current point.

3 Claims, 2 Drawing Sheets

SPECTRAL PREPROCESSING METHOD AND DEVICE SUITABLE FOR FRUIT NEAR-INFRARED NONDESTRUCTIVE DETECTION, AND COMPUTER-READABLE MEDIUM

CROSS-REFERENCE TO RELATED APPLICATION

This application claims the priority benefit of China application serial no. 202310604351.2, filed on May 26, 2023. The entirety of the above-mentioned patent application is hereby incorporated by reference herein and made a part of this specification.

TECHNICAL FIELD

The present disclosure relates to the technical field of preprocessing of near-infrared spectral signals, in particular to a spectral preprocessing method and device suitable for fruit near-infrared nondestructive detection.

BACKGROUND

Near-infrared spectroscopy (NIR) refers to electromagnetic waves with a wavelength ranging from 780 nm to 2526 nm. The interval from 780 nm to 1100 nm is short-wave near-infrared, and the interval from 1100 nm to 2526 nm is long-wave near-infrared. When a beam of near-infrared light passes through a substance with near-infrared absorption, the molecules of the substance absorb different energy and form an absorption spectrum in the near-infrared region, which is the basis of the near-infrared spectrum analysis method. Due to the strong penetration ability of near-infrared light and no destruction to the detected objects and the fact that deep quality information inside fruits can be obtained by using a near-infrared diffuse transmission method, the near-infrared spectral analysis method has been widely used in nondestructive sorting and quality detection of fruits.

The signal obtained by the spectrometer when acquiring the near-infrared spectrum of fruit samples contains noise and interference from various external unfavorable factors, the noise mainly includes background noise and dark current of the spectrometer, and the unfavorable interference includes baseline shift and baseline drift resulted from uneven samples, light scattering and different optical paths. Therefore, it is necessary to preprocess the spectrum to reduce noise and the influence of various interferences and improve the accuracy of subsequent modeling when using the near-infrared spectrum analysis technology to analyze the substance composition of the sample.

In prior art, most of the schemes of preprocessing near-infrared spectral signals include: using a moving average smoothing method and an SG (Savitzky-Golay) convolution smoothing method to remove high-frequency noise, and using first-order and second-order differential processing to deduct baseline shift and drift. The SG convolution smoothing method is detailed in the book Molecular Spectroscopy Analytical Technology Combined with Chemometrics and its Applications edited by Chu Xiaoli. However, the existing moving average smoothing method and SG convolution smoothing method need to determine the size of the smoothing window. If the window is too large, over-smoothing will occur, while if the window is too small, under-smoothing will occur. The sensitivity of an ordinary grating spectrometer in a near-infrared interval is lower than that in a visible light interval, which will lead to different signal-to-noise ratios of the spectrum in different intervals. If the same filter parameters are used, some bands may be under-fitted and some bands may be over-fitted. The first-order and second-order differential method will add noise in the process of dealing with baseline shift and drift. The noise can be reduced by using multi-point difference and filtered data difference, while satisfactory results cannot be obtained.

SUMMARY OF INVENTION

A brief summary of embodiments of the present disclosure is given hereinafter in order to provide a basic understanding of some aspects of the present disclosure. It should be understood that the following summary is not an exhaustive summary of the present disclosure, which is not intended to identify key or important parts of the present disclosure or intended to limit the scope of the present disclosure. The purpose is only to present some concepts in a simplified form as a prelude to the more detailed description to be discussed later.

In order to solve the above technical problems, the present disclosure provides a spectral preprocessing method suitable for fruit near-infrared nondestructive detection. According to spectral data characteristics of fruit near-infrared nondestructive detection, a segmented adaptive parameter filtering method is proposed, which finds different optimal filtering parameters in different signal-to-noise ratio intervals, and reduces the problems of under-fitting and over-fitting of the existing filtering method. In order to solve the noise problem of baseline shift and drift caused by a differential method, the derivative of a polynomial fitting function at data points is directly obtained, and the filtering and derivative processes are unified in one step, which effectively reduces noise caused by differential derivative, improves the data quality and provides a good foundation for subsequent modeling.

According to one aspect of the present disclosure, a spectral preprocessing method suitable for fruit near-infrared nondestructive detection is provided, including:

Step 1: measuring absorbance, and calculating overall noise distribution of spectral data by using second-order difference;

Step 2: performing adaptive threshold segmentation on the spectral data according to the noise distribution, and forming a plurality of segmentation intervals, calculating noise of each interval in each segmentation interval, performing cyclic adaptive parameter SG filtering on each interval of an original spectrum with a residual less than a noise threshold as an optimization objective, and finding optimal filtering parameters;

Step 3: using the optimal filter parameters to perform sliding polynomial fitting on the spectral data within the respective intervals, and deriving a derivative of a fitting polynomial of each point at a current point;

Step 4: calculating derivatives of all points of absorbance data point by point.

According to the present disclosure, SG filtering is improved, the spectral data is divided into segmentation intervals by adaptive threshold segmentation, the optimal filtering parameters of each segmentation interval are found, and then the optimal filtering parameters are integrated with the derivative to be completed in one step, so that the data quality after derivation is effectively improved.

Further, the measuring absorbance in Step 1 includes the following process: turning off light source, putting calibrated white balls and fruit samples respectively, turning on a spectrometer to acquire spectral data $i_w$ and $i_0$ on the back of the white balls and fruit samples as background signals of the spectrometer, then turning on a light to preheat for a preset time, acquiring transmission near-infrared spectra $I_w$ and $I_0$ of the white balls and fruit samples respectively, and calculating an absorbance sequence A with the calculation formula as follows:

$$A = lg \frac{I_w - i_w}{I_0 - i_0}$$

w is a natural number.

Further, the calculating overall noise distribution of spectral data by using second-order difference in Step 1 includes the following process:

performing interval interception on the absorbance sequence A, and taking a preset interval band to generate a new absorbance sequence $A_0$; and performing second-order difference operation on $A_0$, wherein the second-order difference operation is using an [1,−2,1] operator to perform sliding convolution on $A_0$, and generating a second-order difference absorbance sequence A", and the A" is used to reflect noise distribution of the absorbance sequence $A_0$.

Further, the Step 2 specifically includes the following process:

finding optimal interval segmentation of noise according to the absorbance second-order difference sequence A", and presetting two segmentation points $t_1$: 650 nm and $t_2$: 870 nm according to characteristics of fruit near-infrared transmission spectral data, and forming three segmentation intervals;

wherein the numbers of spectral points in the three segmentation intervals are respectively denoted as $n_1$, $n_2$ and $n_3$, spectral average values in the three segmentation intervals are respectively denoted as $m_1$, $m_2$ and $m_3$, an overall spectral average value is $m_0$, an interval between-class variance $f(t_1,t_2)=u^2$ at this time is calculated, an arithmetic square root of the between-class variance $u^2$ is an between-class standard deviation u, and the calculation process of the between-class variance $u^2$ is as follows:

the probability that the spectrum falls into three intervals is respectively denoted as $q_1$, $q_2$ and $q_3$, and:

$$q_1 = \frac{n_1}{n_1 + n_2 + n_3}$$

$$q_2 = \frac{n_2}{n_1 + n_2 + n_3}$$

$$q_3 = \frac{n_3}{n_1 + n_2 + n_3};$$

the following relationship is satisfied:

$q_1 * m_1 + q_2 * m_2 + q_3 * m_3 = m_0$ $q_1 + q_2 + q_3 = 1$ the expression of between-class variance $u^2$ is:

$u^2 = q_1 * (m_1 - m_0)^2 + q_2 * (m_2 - m_0)^2 + q_3 * (m_3 - m_0)^2;$ setting an upper limit of the number of cycles, randomly adjusting the segmentation points $t_1$ and $t_2$ ($580 < t_1 < t_2 < 1000$) repeatedly, and calculating new $f(t_1, t_2)$ circularly, and a maximal between-class variance found at the end of circulation corresponds to $(t_1, t_2)$:

$f(t_1, t_2) = u^2.$ $$(t_1, t_2) = \underset{580 < t_1 < t_2 < 1000}{\arg \max} f(t_1, t_2);$$

at this time, the segmentation points $t_1$ and $t_2$ are optimal segmentation points, and the absorbance second-order difference sequence A" is segmented into three parts: $A_1$", $A_2$" and $A_3$";

a method of calculating average noises $s_1$, $s_2$ and $s_3$ of $A_1$", $A_2$" and $A_3$" respectively is as follows:

taking $A_1$" as an example, segmenting $A_1$" into L intervals $Seg_i$ (i=0,1,2 ... L−1) equally, in which the number of data points in each interval is n, calculating the average value v and the standard deviation σ of the data in each interval, finding the interval $Seg_i$ with a minimal standard deviation with the average value $v_i$ and the standard deviation $σ_i$, covering the interval $Seg_i$ with a window with a width of n, sliding to the right for detection, moving one data point at a time, calculating whether the data point belongs to the interval of $[v_i-3σ_i, v_i+3σ_i]$, if so, keeping this point unchanged, if not, replacing this point with the average value of the data in the current window, repeating the above steps until all the data on the right are detected, detecting the data on the left using the same method, calculating the standard deviation $σ_{A1}$ of the processed $A_1$" finally, and calculating the standard deviation $σ_{A2}$ and $σ_{A3}$ of $A_2$" and $A_3$" using the same method;

$s_1 = \sqrt{6}σ_{A1}, s_2 = \sqrt{6}σ_{A2}, s_3 = \sqrt{6}σ_{A3};$ segmenting the absorbance sequence $A_0$ into intervals $A_1$, $A_2$ and $A_3$ by the segmentation points $t_1$ and $t_2$, in which the numbers of spectral points in the three intervals are $n_1$, $n_2$ and $n_3$ respectively, SG filtering is respectively used in each interval, initial parameters are window w=5, order g=3, filtered data are $A_1^*$, $A_2^*$, and $A_3^*$, residuals are $ε_1$, $ε_2$ and $ε_3$, respectively; in which the residuals are calculated using the following formulas:

$$ε_1 = \sqrt{\frac{\sum_{i=1}^{n_1}(A_1(i) - A_1^*(i))^2}{n_1}};$$

$$ε_2 = \sqrt{\frac{\sum_{i=1}^{n_2}(A_2(i) - A_2^*(i))^2}{n_2}};$$

$$ε_3 = \sqrt{\frac{\sum_{i=1}^{n_3}(A_3(i) - A_3^*(i))^2}{n_3}};$$

traversing parameters, fixing the order first, traversing the window, adding 2 to the window $w_1$ ($5 ≤ w_1 ≤ n_1/2$, $w_1 = 2i+1$, $i \in Z$) each time and adding 1 to the order $g_1$ ($3 ≤ g_1$, $g_1 \in Z$) each time, calculating new residuals iteratively until $ε1$ is greater than $s_1$, stopping iteration, obtaining the parameters $w_1$ and $g_1$ at this time which are the optimal parameters of the SG filtering, and obtaining $w_2$, $g_2$, $w_3$, and $g_3$ using the same method.

Further, the Step 3 specifically includes the following process: using the optimal filter parameters obtained in the Step 2 to perform sliding polynomial fitting within the respective intervals $A_1$, $A_2$ and $A_3$, in which a fitting coefficient of each point is $p[p_0, p_1 \ldots p_{g-2}, p_{g-1}]$, that is:

$$A(i)=p_0+p_1*i+p_2*i^2+p_3*i^3+\ldots+p_{g-1}*i^{g-1};$$

in which $$-\frac{w-1}{2} \leq i \leq \frac{w-1}{2}, i \in Z;$$

calculating the first and second derivatives of the polynomial at a center point of the window according to the fitting coefficient, and the calculation formula is:

$$A'(i)=p_1+2*p_2*i+3*p_3*i^{2+}\ldots+(g-1)*p_{g-1}*i^{g-2};$$

$$A''(i)=2*p_2+6*p_3*i+\ldots+(g-2)*(g-1)*p_{g-1}*i^{g-3};$$

i=0 at the center of the window;

$$A'(0)=p_1, A''(0)=2*p_2;$$

using a sliding window to calculate a derivative value of the center point of the window point by point according to the above formula, and directly obtaining the filtered first derivative $A'(i)$ and second derivative $A''(i)$.

According to another aspect of the present disclosure, a spectral preprocessing device suitable for fruit near-infrared nondestructive detection is further provided, including:

an absorbance calculating module, which is configured to measure absorbance;

a noise distribution calculating module, which is configured to calculate overall noise distribution of spectral data by using second-order difference;

an optimal filter parameter calculating module, which is configured to perform adaptive threshold segmentation on the spectral data according to the noise distribution to form a plurality of segmentation intervals, calculate noise of each interval in each segmentation interval, perform cyclic adaptive parameter SG filtering on each interval of an original spectrum with a residual less than a noise threshold as an optimization objective to find optimal filtering parameters;

a polynomial fitting module, which is configured to use the optimal filter parameters to perform sliding polynomial fitting on the spectral data within the respective intervals, and derive a derivative of a fitting polynomial of each point at a current point;

an all-point derivative calculating module, which is configured to calculate derivatives of all points of absorbance data point by point.

According to yet another aspect of the present application, a computer-readable medium is further provided, wherein the computer-readable medium stores a program code executable by a processor, and the program code causes the processor to perform any above of the spectral preprocessing method.

According to spectral data characteristics of fruit near-infrared nondestructive detection, the present disclosure provides a segmented adaptive parameter filtering method, which finds different optimal filtering parameters in different signal-to-noise ratio intervals and reduces the problems of under-fitting and over-fitting of the existing filtering method.

In order to solve the noise problem of baseline shift and drift increased by a differential method, the derivative of a polynomial fitting function at data points is directly obtained, and the filtering and derivative processes are unified in one step, which effectively reduces noise increased by differential derivative, improves the data quality and provides a good foundation for subsequent modeling.

BRIEF DESCRIPTION OF THE DRAWINGS

The present disclosure can be better understood with reference to the following descriptions given in conjunction with the accompanying drawings, in which the same or similar reference numerals are used to indicate the same or similar parts throughout the accompanying drawings. The accompanying drawings, together with the detailed description hereinafter, are included and form a part of this specification, and serve to further illustrate preferred embodiments of the present disclosure and explain the principles and advantages of the present disclosure. In the accompanying drawings.

DETAILED DESCRIPTION OF THE EMBODIMENTS

Embodiments of the present disclosure will be described hereinafter with reference to the accompanying drawings. Elements and features described in one drawing or one embodiment of the present disclosure may be combined with elements and features shown in one or more other drawings or embodiments. It should be noted that for the sake of clarity, representations and descriptions of components and processes that are not related to the present disclosure and are known to those skilled in the art are omitted from the accompanying drawings and descriptions.

Figure 1:
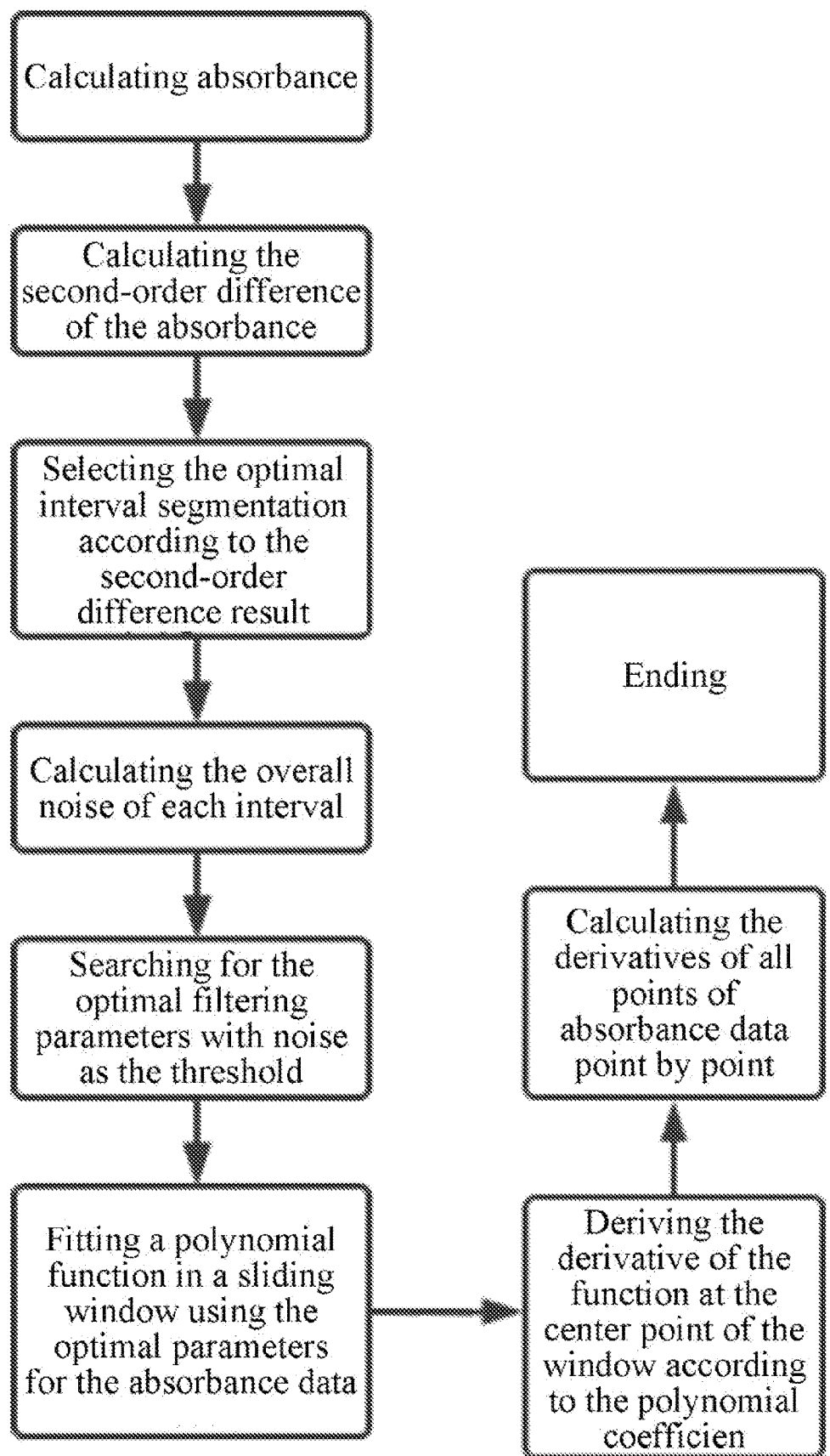
FIG. 1 is a flowchart of a spectral preprocessing method according to an embodiment of the present disclosure.

The embodiment of the present disclosure provides a spectral preprocessing method suitable for fruit near-infrared nondestructive detection. The flow chart is shown in FIG. 1, including:

$$A'(i)=p_1+2*p_2*i+3*p_3*i^2+\ldots+(g-1)*p_{g-1}*i_{g-2};$$

Process 1: measuring absorbance of the sample to be tested;

Process 1: calculating the second-order difference of the absorbance;

Process 2: selecting the optimal interval segmentation according to the second-order difference result;

Process 3: calculating the overall noise of each interval;

Process 4: searching for the optimal filtering parameters with noise as the threshold;

Process 5: fitting a polynomial function in a sliding window using the optimal parameters for the absorbance data;

Process 6: deriving the derivative of the function at the center point of the window according to the polynomial coefficient;

Process 7: calculating the derivatives of all points of absorbance data point by point;

Process 8: ending.

The process 2-4 selects the optimal interval segmentation according to the second-order difference result, calculates the overall noise of each interval, and searches for the optimal filtering parameters with the noise as the threshold.

Specifically, adaptive threshold segmentation is performed on the spectral data according to the noise distribution to form a plurality of segmentation intervals, noise of each interval is calculated in each segmentation interval, cyclic adaptive parameter SG filtering is performed on each interval of an original spectrum with a residual less than a noise threshold as an optimization objective, and optimal filtering parameters are found.

The process 5 specifically includes using the optimal filter parameters to perform sliding polynomial fitting on the spectral data within the respective intervals, and deriving a derivative of a fitting polynomial of each point at a current point.

The method of dividing the interval and finding the optimal parameters is an improvement of the existing SG filtering, and the SG filtering and derivative are integrated to be completed in one step, so that the data quality after derivation is effectively improved.

Specifically, as a specific embodiment, the spectral preprocessing specifically includes the following steps:

Step 1: light source is turned off, calibrated white balls and fruit samples are put respectively, a spectrometer is turned on to acquire spectral data $i_w$ and $i_0$ on the back of the white balls and fruit samples as background signals of the spectrometer, then a light is turned on to preheat for 30 minutes, transmission near-infrared spectra $I_w$ and $I_0$ of the white balls and fruit samples are respectively acquired, and an absorbance sequence A is calculated with the calculation formula as follows:

$$A = lg\frac{I_w - i_w}{I_0 - i_0}.$$

Figure 2:
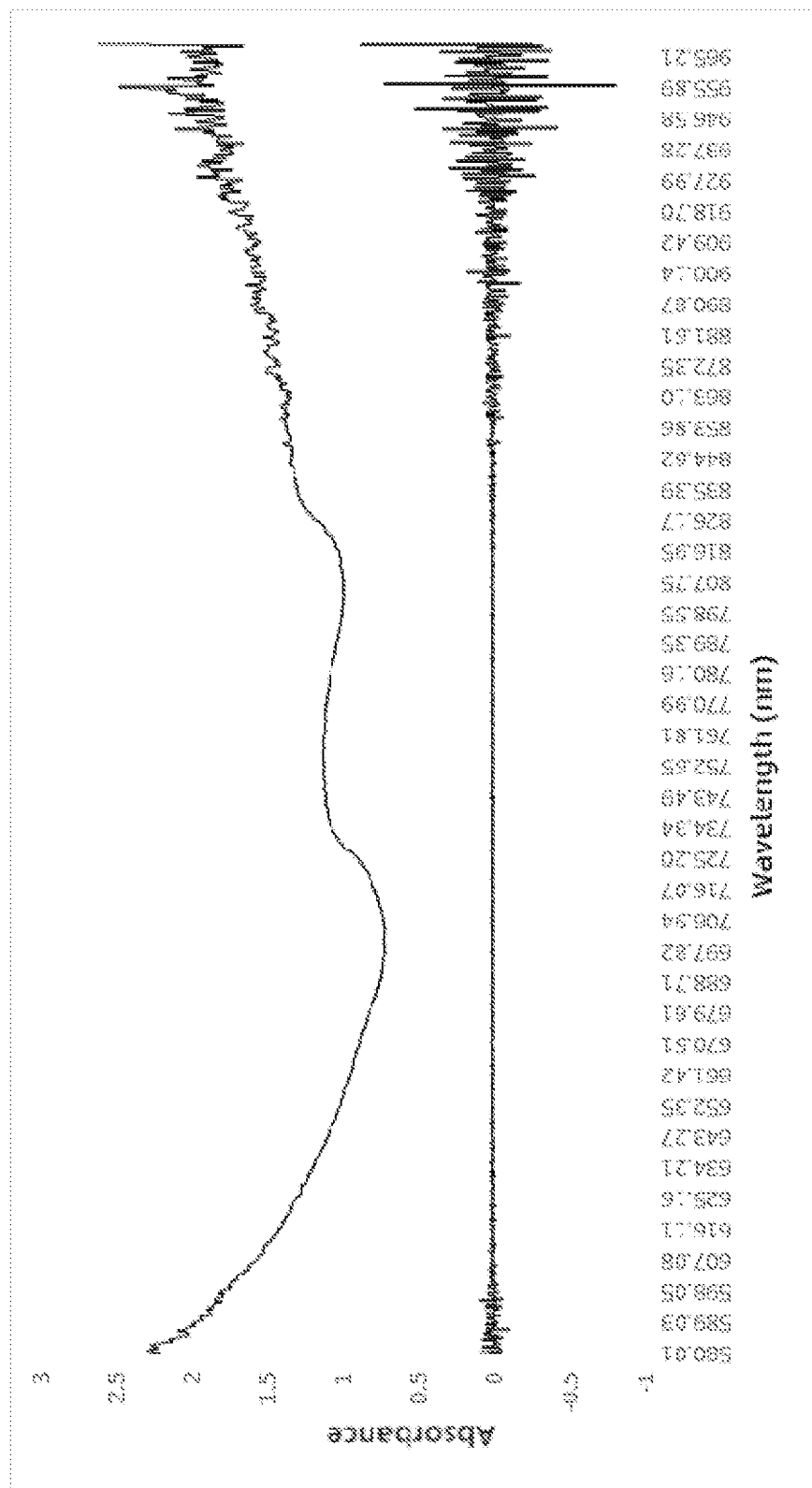
FIG. 2 is a schematic diagram of A" reflecting noise distribution of an absorbance sequence $A_0$.

Step 2: interval interception is performed on the absorbance sequence A, an interval band from 580 nm to 1000 nm is taken to generate a new absorbance sequence $A_0$, and second-order difference operation is performed on $A_0$, wherein the method is to use [1,−2,1] operator to perform sliding convolution on $A_0$ to generate a second-order difference absorbance sequence A", and A" can reflect noise distribution of the absorbance sequence $A_0$ (as shown in FIG. 2).

Step 3: optimal interval segmentation of noise is found according to the absorbance second-order difference sequence A", and two segmentation points $t_1$: 650 nm and $t_2$: 870 nm are preset to form three segmentation intervals according to characteristics of fruit near-infrared transmission spectral data. Because the grating type near-infrared spectrometer is characterized in that the sensitivity in the near-infrared region is lower than that in a visible light interval, the noise is calculated innovatively according to intervals in the present disclosure. In addition, because the absorption band of the main components of fruits is in the interval of 800 to 950, it is especially necessary to improve the signal quality in this interval. When being set, multiple intervals can be set. In view of the fact that the more intervals, the greater the calculation amount. According to the characteristics of fruit near-infrared spectrum, based on a large number of experiments, the applicant found that setting three intervals is most suitable, and two segmentation points are respectively set as $t_1$: 650 nm and $t_2$: 870 nm. Of course, the values of $t_1$ and $t_2$ are not necessarily 650 nm and 870 nm, $t_1$ can be in the range of 650 nm±50 nm, and $t_2$ can be in the range of 870 nm±50 nm.

The numbers of spectral points in the three segmentation intervals are respectively denoted as $n_1$, $n_2$ and $n_3$, spectral average values in the three intervals are respectively denoted as $m_1$, $m_2$ and $m_3$, an overall spectral average value is $m_0$, an interval inter-class variance $f(t_1,t_2)=u^2$ at this time is calculated, an arithmetic square root of the inter-class variance $u^2$ is an inter-class standard deviation u, and the calculation process of the inter-class variance $u^2$ is as follows:

The probability that the spectrum falls into three intervals is respectively denoted as $q_1$, $q_2$ and $q_3$, and:

$$q_1 = \frac{n_1}{n_1 + n_2 + n_3}$$
$$q_2 = \frac{n_2}{n_1 + n_2 + n_3}$$
$$q_3 = \frac{n_3}{n_1 + n_2 + n_3}$$

The following formulas are satisfied:

$$q_1*m_1+q_2*m_2+q_3*m_3=m_0$$

$$q_1+q_2+q_3=1$$

The formula of inter-class variance $u^2$ is:

$$u^2=q_1*(m_1-m_0)^2+q_2*(m_2-m_0)^2+q_3*(m_3-m_0)^2.$$

An upper limit of the number of cycles is set as 1000 using an optimization algorithm (such as a simulated annealing algorithm), the segmentation points $t_1$ and $t_2$ (580<$t_1$<$t_2$<1000) are randomly adjusted repeatedly, and new $f(t_1,t_2)$ is calculated, and the found $(t_1,t_2)$ corresponding to a maximal inter-class variance ends circularly:

$$f(t_1,t_2)=u^2;$$

$$(t_1, t_2) = \underset{580<t_1<t_2<1000}{\mathrm{argmax}} f(t_1, t_2).$$

At this time, the segmentation points $t_1$ and $t_2$ are the optimal segmentation points, and the absorbance second-order difference sequence A" is segmented into three parts: $A_1$", $A_2$" and $A_3$".

Step 4: a specific method of calculating average noises $s_1$, $s_2$ and $s_3$ of $A_1$", $A_2$" and $A_3$" respectively is as follows:

taking $A_1$" as an example, segmenting $A_1$" into L intervals $Seg_i$(i=0,1,2 . . . L−1) equally, in which the number of data points in each interval is n, calculating the average value v and the standard deviation σ of the data in each interval, finding the interval $Seg_i$ with a minimal standard deviation with the average value $v_i$ and the standard deviation $\sigma_i$, covering the interval $Seg_i$ with a window with a width of n, sliding to the right for detection, moving one data point at a time, calculating whether the data point belongs to the interval of [$v_i$−3$\sigma_i$,$v_i$+3$\sigma_i$], if so, keeping this point unchanged, if not, replacing this point with the average value of the data in the current window, repeating the above steps until all the data on the right are detected, detecting the data on the left using the same method, calculating the standard deviation $\sigma_{A1}$ of the processed $A_1$" finally, and calculating the standard deviation $\sigma_{A2}$ and $\sigma_{A3}$ of $A_2$" and $A_3$" using the same method;

$$s_1=\sqrt{6}\sigma_{A1}, s_2=\sqrt{6}\sigma_{A2}, s_3=\sqrt{6}\sigma_{A3}.$$

Step 5: the absorbance sequence $A_0$ is segmented into intervals $A_1$, $A_2$ and $A_3$ by the segmentation points $t_1$ and $t_2$, in which the numbers of spectral points in the three intervals respectively are $n_1$, $n_2$ and $n_3$, SG filtering is respectively used in each interval, initial parameters are window w=5, order g=3, the filtered data are $A_1^*$, $A_2^*$, and $A_3^*$, residuals are $\varepsilon_1$, $\varepsilon_2$ and $\varepsilon_3$, respectively, in which the residuals are calculated using the following formulas:

$$\varepsilon_1 = \sqrt{\frac{\sum_{i=1}^{n_1}(A_1(i) - A_1^*(i))^2}{n_1}};$$

$$\varepsilon_2 = \sqrt{\frac{\sum_{i=1}^{n_2}(A_2(i) - A_2^*(i))^2}{n_2}};$$

$$\varepsilon_3 = \sqrt{\frac{\sum_{i=1}^{n_3}(A_3(i) - A_3^*(i))^2}{n_3}}.$$

Parameters are traversed, the order is fixed first, the window is traversed, 2 is added to the window $w_1$ ($5 \leq w_1 \leq n_1/2$, $w_1=2i+1$, $i \in Z$) each time and 1 is added to the order $g_1$ ($3 \leq g_1$, $g_1 \in Z$) each time, new residuals are calculated iteratively until $\varepsilon_1$ is greater than $s_1$, iteration stops, the parameters $w_1$ and $g_1$ are obtained at this time which are the optimal parameters of the SG filtering, and $w_2$, $g_2$, $w_3$, and $g_3$ are obtained using the same method.

Step 6: the optimal filter parameters obtained in the Step 5 are used to perform sliding polynomial fitting within the respective intervals $A_1$, $A_2$ and $A_3$, in which a fitting coefficient of each point is $p[p_0, p_1 \ldots P_{g-2}, P_{g-1}]$, that is:

$$A(i)=p_0+p_1*i+p_2*i^2+p_3*i^3+\ldots+p_{g-1}*i^{g-1};$$

in which $$-\frac{w-1}{2} \leq i \leq \frac{w-1}{2}, i \in Z.$$

The first and second derivatives of the polynomial at a center point of the window are calculated according to the fitting coefficient, and the calculation formula is:

$$A'(i)=p_1+2*p_2*i+3*p_3*i^2+\ldots+(g-1)*p_{g-1}*i^{g-2};$$

$$A''(i)=2*p_2+6*p_3*i+\ldots+(g-2)*(g-1)*p_{g-1}*i^{g-3};$$

i=0 at the center of the window;

$$A'(0)=p_1, A''(0)=2*p_2.$$

A sliding window is used to calculate a derivative value of the center point of the window point by point according to the above formula, and the filtered first derivative $A'(i)$ and second derivative $A''(i)$ are directly obtained.

According to the scheme, the present disclosure has the following advantages: 1. The optimal interval is divided according to the signal-to-noise ratio in combination with the transmission spectrum characteristics of fruits, and the optimal filtering parameters are searched with the average noise of the interval as the threshold limit in each interval, so that the first and second derivatives of the signal-to-noise ratio are obtained. Therefore, the noise increased by differential derivation can be effectively reduced, and the data quality is further improved. In the prior art, SG filtering is a very common filtering method. In the present disclosure, SG filtering is optimized, the optimal interval segmentation step is added, the noise of each interval is calculated, and the filtering parameters are adjusted with the noise as the optimization threshold, so that the optimal parameters are ensured to be used in each interval. 2. In the prior art, the scheme is to perform generally direct differential derivative operation, which will increase noise. Every time the first derivative is added, noise will be increased, resulting in a low signal-to-noise ratio of the second derivative. In the present disclosure, differential operation is replaced by derivation using a fitting function, thereby further reducing the noise increased by differential derivation. 3. The present disclosure integrates the optimized SG filtering and derivative, effectively reducing the extra noise of common differential derivation, improving the data quality and providing a good foundation for subsequent modeling.

The embodiment of the present disclosure further provides a computer-readable medium, wherein the computer-readable medium stores a program code executable by a processor, and the program code causes the processor to perform the spectral preprocessing method described above.

The embodiment of the present disclosure further provides a spectral preprocessing device suitable for fruit near-infrared nondestructive detection, including:

an absorbance calculating module, which is configured to measure absorbance;

a noise distribution calculating module, which is configured to calculate overall noise distribution of spectral data by using second-order difference;

an optimal filter parameter calculating module, which is configured to perform adaptive threshold segmentation on the spectral data according to the noise distribution to form a plurality of segmentation intervals, calculate noise of each interval in each segmentation interval, perform cyclic adaptive parameter SG filtering on each interval of an original spectrum with a residual less than a noise threshold as an optimization objective to find optimal filtering parameters;

a polynomial fitting module, which is configured to use the optimal filter parameters to perform sliding polynomial fitting on the spectral data within the respective intervals, and derive a derivative of a fitting polynomial of each point at a current point;

an all-point derivative calculating module, which is configured to calculate the derivatives of all points of absorbance data point by point.

In addition, the method of the present disclosure is not limited to being executed in the time sequence described in the specification, but can also be executed in other time sequences, in parallel or independently. Therefore, the execution order of the method described in this specification does not limit the technical scope of the present disclosure.

Although the present disclosure has been disclosed by describing specific embodiments thereof, it should be understood that all the above embodiments and examples are illustrative and not restrictive. Those skilled in the art can design various modifications, improvements or equivalents to the present disclosure within the spirit and scope of the appended claims. These modifications, improvements or equivalents should also be considered as included in the protection scope of the present disclosure.

What is claimed is:

1. A spectral preprocessing method suitable for fruit near-infrared nondestructive detection, comprising:
   Step 1: measuring absorbance, and calculating overall noise distribution of spectral data by using second-order difference;
   Step 2: performing adaptive threshold segmentation on the spectral data according to the noise distribution, and forming a plurality of segmentation intervals, calculating a noise of each interval in each segmentation interval, performing cyclic adaptive parameter SG (Savitzky-Golay) filtering on each interval of an original spectrum with a residual less than a noise threshold as an optimization objective, and finding optimal filtering parameters;
   Step 3: using the optimal filter parameters to perform sliding window polynomial fitting on the spectral data within the respective intervals, and deriving a derivative of a fitting polynomial of each point at a current point;
   Step 4: calculating derivatives of all points of absorbance data point by point;
   the measuring absorbance in the Step 1 comprises the following process: turning off a light source, putting calibrated white balls and fruit samples respectively, turning on a spectrometer to acquire spectral data $i_w$ and $i_0$ on backs of the white balls and the fruit samples as background signals of the spectrometer, then turning on a light to preheat for a preset time, acquiring transmission near-infrared spectra $I_w$ and $I_0$ of the white balls and the fruit samples respectively, and calculating an absorbance sequence A with a calculation formula as follows:

$$A = lg \frac{I_w - i_w}{I_0 - i_0};$$

the calculating overall noise distribution of the spectral data by using second-order difference in the Step 1 comprises the following process:
   performing interval interception on the absorbance sequence A, and taking a preset interval band to generate a new absorbance sequence $A_0$; and performing second-order difference operation on $A_0$, wherein the second-order difference operation is using an [1,−2,1] operator to perform sliding convolution on $A_0$, and generating a second-order difference absorbance sequence A", and the A" is used to reflect noise distribution of the absorbance sequence $A_0$;
   the Step 2 specifically comprises the following process:
   finding optimal interval segmentation of the noise according to the absorbance second-order difference sequence A", and presetting two segmentation points $t_1$: 650 nm and $t_2$: 870 nm according to characteristics of fruit near-infrared transmission spectral data, and forming three segmentation intervals;
   wherein the numbers of spectral points in the three segmentation intervals are respectively denoted as $n_1$, $n_2$ and $n_3$, spectral average values in the three segmentation intervals are respectively denoted as $m_1$, $m_2$ and $m_3$, an overall spectral average value is $m_0$, an interval between-class variance $f(t_1,t_2)=u^2$ at this time is calculated, an arithmetic square root of the interval between-class variance $u^2$ is an between-class standard deviation u, and a calculation process of the interval between-class variance $u^2$ is as follows:
   probabilities that a spectrum falls into three intervals are respectively denoted as $q_1$, $q_2$ and $q_3$, and:

$$q_1 = \frac{n_1}{n_1 + n_2 + n_3}$$
$$q_2 = \frac{n_2}{n_1 + n_2 + n_3};$$
$$q_3 = \frac{n_3}{n_1 + n_2 + n_3}$$

the following formulas is satisfied:

$$q_1*m_1+q_2*m_2+q_3*m_3=m_0$$

$$q_1+q_2+q_3=1;$$

the formula of the inverval between-class variance $u^2$ is:

$$u^2=q_1*(m_1-m_0)^2+q_2*(m_2-m_0)^2+q_3*(m_3-m_0)^2;$$

setting an upper limit of the number of cycles, adjusting the segmentation points $t_1$ and $t_2$ ($580<t_1<t_2<1000$) randomly and repeatedly, and calculating a new $f(t_1,t_2)$ circularly, and a maximal between-class variance found at the end of circulation corresponds to $(t_1,t_2)$:

$$f(t_1, t_2) = u^2;$$

$$(t_1, t_2) = \underset{580<t_1<t_2<1000}{\mathrm{argmax}} \; f(t_1, t_2);$$

at this time, the segmentation points $t_1$ and $t_2$ are optimal segmentation points, and the absorbance second-order difference sequence A" is segmented into three parts: $A_1"$, $A_2"$ and $A_3"$;
   calculating average noises $s_1$, $s_2$ and $s_3$ of $A_1"$, $A_2"$ and $A_3"$ respectively;
   segmenting the absorbance sequence $A_0$ into intervals $A_1$, $A_2$ and $A_3$ by the segmentation points $t_1$ and $t_2$, in which the numbers of spectral points in the three intervals are $n_1$, $n_2$ and $n_3$ respectively, SG filtering is respectively used in each interval, initial parameters are a window w=5, an order g=3, data after filtering are $A_1^*$, $A_2^*$, and $A_3^*$, residuals are $\varepsilon_1$, $\varepsilon_2$ and $\varepsilon_3$, respectively; in which the residuals are calculated using the following formulas:

$$\varepsilon_1 = \sqrt{\frac{\sum_{i=1}^{n_1}(A_1(i)A_1^*(i))^2}{n_1}};$$

$$\varepsilon_2 = \sqrt{\frac{\sum_{i=1}^{n_2}(A_2(i) - A_2(i))^2}{n_2}};$$

$$\varepsilon_3 = \sqrt{\frac{\sum_{i=1}^{n_3}(A_3(i) - A_3^*(i))^2}{n_3}};$$

traversing parameters, fixing the order first, traversing the window, adding 2 to the window $w_1$ ($5 \leq w_1 \leq n_1/2$, $w_1 = 2i+1$, $i \in Z$) each time, and adding 1 to the order $g_1$ ($3 \leq g_1$, $g_1 \in Z$) each time, calculating new residuals iteratively until $\varepsilon_1$ is greater than $s_1$, stopping iteration, obtaining the parameters $w_1$ and $g_1$ at this time which are the optimal parameters of the SG filtering, and obtaining $w_2$, $g_2$, $w_3$, and $g_3$ using the same method;

a specific method of calculating the average noises $s_1$, $s_2$ and $s_3$ of $A_1''$, $A_2''$ and $A_3''$ respectively is as follows:

taking $A_1''$ as an example, segmenting $A_1''$ into L intervals $Seg_i$ ($i=0,1,2 \ldots L-1$) equally, in which the number of data points in each interval is n, calculating an average value v and a standard deviation $\sigma$ of the data in each interval, finding an interval $Seg_i$ with a minimal standard deviation with an average value $v_i$ and a standard deviation $\sigma_i$, covering the interval $Seg_i$ with a window with a width of n, sliding to a right for detection, moving one data point at a time, calculating whether the data point belongs to an interval of $[v_i-3\sigma_i, v_i+3\sigma_i]$, if so, keeping this point unchanged, if not, replacing this point with the average value of the data in the current window, repeating the above steps until all the data on the right are detected, detecting the data on a left using the same method, calculating a standard deviation $\sigma_{A1}$ of the processed $A_1''$ finally, and calculating standard deviations $\sigma_{A2}$ and $\sigma_{A3}$ of $A_2''$ and $A_3''$ using the same method;

$s_1 = \sqrt{6}\sigma_{A1}, s_2 = \sqrt{6}\sigma_{A2}, s_3 = \sqrt{6}\sigma_{A3};$ the Step 3 specifically comprises the following processes: using the optimal filter parameters obtained in the Step 2 to perform sliding window polynomial fitting within the respective intervals $A_1$, $A_2$ and $A_3$, in which a fitting coefficient of each point is $p[p_0, p_1 \ldots P_{g-2}, p_{g-1}]$, that is:

$A(i) = p_0 + p_1*i + p_2*i^2 + p_3*i^3 + \ldots + p_{g-1}*i^{g-1};$ $$-\frac{w-1}{2} \leq i \leq \frac{w-1}{2}, i \in Z;$$

wherein calculating first and second derivatives of the polynomial at a center point of the window $A'(i) = p_1 + 2*p_2*i + 3*p_3*i^2 + \ldots + (g-1)*p_{g-1}*i^{g-2};$ $A''(i) = 2*p_2 + 6*p_3*i + \ldots + (g-2)*(g-1)*p_{g-1}*i^{g-3};$ $i=0$ at the center of the window;

$A'(0) = p_1, A''(0) = 2*p_2;$ $i=0$ at a window center;

$A'(0) = p_1, A''(0) = 2*p_2;$ sliding window to calculate a derivative value of the center point of the window point by point according to the above formula, and directly obtaining the first derivative $A'(i)$ second derivative $A''(i)$ after filtering.

2. A spectral preprocessing device suitable for fruit near-infrared nondestructive detection, and comprising:
an absorbance calculating module, configured to measure absorbance;
a noise distribution calculating module, configured to calculate overall noise distribution of spectral data by using second-order difference;
an optimal filter parameter calculating module, configured to perform adaptive threshold segmentation on spectral data according to the noise distribution to form a plurality of segmentation intervals, calculate noise of each interval in each segmentation interval, perform cyclic adaptive parameter SG filtering on each interval of an original spectrum with a residual less than a noise threshold as an optimization objective to find optimal filtering parameters;
a polynomial fitting module, configured to use the optimal filter parameters to perform sliding window polynomial fitting on the spectral data within the respective intervals, and derive a derivative of a fitting polynomial of each point at a current point;
an all-point derivative calculating module, configured to calculate derivatives of all points of absorbance data point by point;
the spectral preprocessing device performs the spectral preprocessing method according to claim 1.

3. A computer-readable medium, wherein the computer-readable medium stores a program code executable by a processor, and the program code causes the processor to perform the spectral preprocessing method according to claim 1.

\* \* \* \* \*